Aug. 21, 1962     E. E. McMILLAN     3,049,855
FAN ATTACHMENT FOR ROTARY MOWER BLADE
Filed Feb. 5, 1960
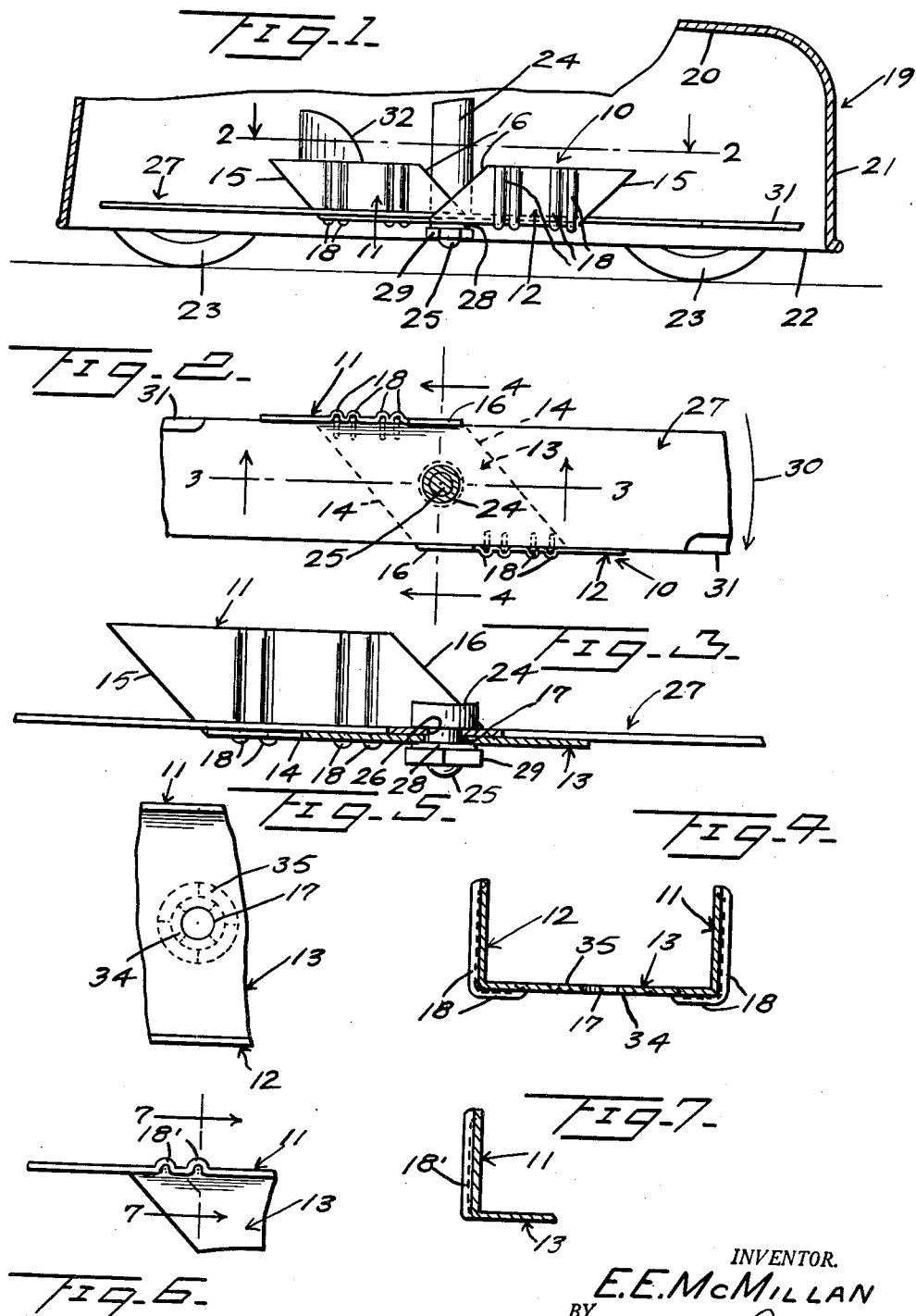
INVENTOR.
E. E. McMILLAN
BY John N. Randolph
atty.

United States Patent Office 3,049,855
Patented Aug. 21, 1962

3,049,855
FAN ATTACHMENT FOR ROTARY MOWER BLADE
Elmer E. McMillan, Mansfield, Mo.
Filed Feb. 5, 1960, Ser. No. 6,937
9 Claims. (Cl. 56—295)

This invention relates to a novel fan or blower attachment of extremely simple construction which may be readily applied to the drive shaft and blade of conventional type rotary mowers to enhance the operating efficiency of such mowers.

More particularly, it is an aim of the invention to provide a fan or blower attachment for blowing the grass clippings centrifugally outward behind the ends of the rotary blade so that the grass clippings will not be thrown upwardly and adhere to the underside of the top wall of the motor housing.

A further object of the invention is to provide a fan attachment which will produce a current of air traveling circumferentially within the motor housing in the same direction as the blade is revolving and in which the grass clippings will be entrained for discharge from the lawn mower through any conventional outlet provided for this purpose.

A further object of the invention is to provide a fan attachment which will not interfere with the normal operation of the cutting edges of the lawn mower blade and wherein the grass will not be subjected to the air currents from the fan until the grass has been cut by the blade.

Another object of the invention is to provide a fan attachment requiring no modification of any of the conventional parts of the lawn mower for mounting the attachment.

Various other objects and advantages of the invention will hereinafter become more fully apparent from the following description of the drawing, illustrating presently preferred embodiments thereof, and wherein:

FIGURE 1 is a fragmentary view, partly in elevation and partly in section, showing parts of a conventional rotary type lawn mower with the fan attachment applied thereto;

FIGURE 2 is a horizontal sectional view taken substantially along a plane as indicated by the line 2—2 of FIGURE 1, and showing the fan attachment in top plan;

FIGURE 3 is an enlarged fragmentary longitudinal sectional view, taken substantially along a plane as indicated by the line 3—3 of FIGURE 2;

FIGURE 4 is a cross sectional view of the fan attachment, on an enlarged scale, taken substantially along a plane as indicated by the line 4—4 of FIGURE 2;

FIGURE 5 is a fragmentary top plan view, on an enlarged scale, showing a part of the fan attachment;

FIGURE 6 is a fragmentary top plan view of another part of the fan attachment and illustrating a modification thereof, and FIGURE 7 is a somewhat enlarged fragmentary vertical sectional view, taken substantially along a plane as indicated by the line 7—7 of FIGURE 6.

Referring more specifically to the drawing, the fan attachment comprising the invention and illustrated in FIGURES 1 to 5 is designated generally 10 and is composed of a single elongated strip, preferably of sheet metal, having corresponding upturned end portions forming vanes 11 and 12 and a substantially flat intermediate portion 13 extending between and connecting said vanes. The vanes 11 and 12 are disposed substantially parallel to one another and approximately at right angles to the intermediate portion 13. The vanes 11 and 12 are folded upwardly relative to the intermediate portion 13 along lines disposed at oblique angles to the side edges 14 of the intermediate portion 13, so that the vanes 11 and 12 are offset endwise relative to one another, as clearly illustrated in FIGURES 1 and 2. Accordingly, each vane 11 and 12 has an upwardly and outwardly inclined downwardly facing edge 15 constituting its outer end and an inclined edge 16 constituting its inner end, which is disposed substantially parallel to the edge 15 but which faces upwardly, as seen in FIGURES 1 and 3. The bottom portion 13 is provided with an opening 17 located midway between the planes of the vanes 11 and 12 and approximately midway between its side edges 14. The vanes 11 and 12 are each provided with externally disposed embossed reinforcing ribs 18 formed by indentations pressed into the interior of said vanes and which reinforcing ribs preferably extend partially into the intermediate portion 13.

A part of a conventional rotary type lawn mower is illustrated in the drawing, primarily in FIGURE 1, including a portion of the lawn mower housing 19 having a top wall 20 and a depending continuous skirt 21 the bottom edge of which defines the open bottom 22 of the housing 19 which is supported in a slightly elevated position by ground engaging wheels 23 of the lawn mower. The rotary drive shaft 24 of the lawn mower extends downwardly through the top wall 20 and is shown provided at its lower end with a restricted threaded extention or stem 25 which extends through a central opening 26 of the elongated mower blade 27.

To apply the fan attachment 10, said attachment is applied to the blade 27 so that the intermediate portion 13 is disposed against the underside of the intermediate portion of the blade 27 with the opening 17 in alignment with the opening 26 and with the vanes 11 and 12 extending upwardly from the two longitudinal edges of the the blade 27. The vanes 11 and 12 are spaced apart relative to the width of the blade 27 so that the side edges of the blade will abut the inner sides of the bottom portions of the two vanes, as seen in FIGURE 2. Whereas the blade 27 is usually secured on the shaft stem 25 by a washer 28 and nut 29 which are disposed with the washer abutting the underside of the blade and held by the nut 29, said washer and nut are applied below the intermediate or base portion 13 of the fan attachment, as seen in FIGURE 3, for securing the blade and fan attachment to the drive shaft 24 and for also securing the fan attachment to the blade 27. It will be understood that the fan attachment 10 can be utilized with other conventional types of connections between the mower drive shaft and blade.

The blade 27 and shaft 24 turn in the direction as indicated by the arrow 30 in FIGURE 2 and the leading edges of the end portions of the blade 27 are sharpened to provide cutting edges 31 which are disposed beyond and spaced outwardly from the vane edges 15.

In the conventional operation of a rotary type lawn mower the grass cut by the cutting edges 31 is thrown upwardly due to the fact that said cutting edges produce an updraft of air. Consequently, the grass clippings adhere to and build up a thick cake on the underside of the top wall 20 of the housing and which requires frequent cleaning. The fan attachment 10 eliminates this problem and enhances the movement of the grass clippings to the mower outlet 32. As the fan 10 revolves with the blade 27 the outer surfaces of the vanes 11 and 12 will impinge against and deflect the air, against which said vanes move, toward the outer edge 15 of the vanes by centrifugal force. The air escaping around the edges 15 will be deflected outwardly toward the apron 21 and also downwardly away from the top wall 20 due to the inclined disposition of the downwardly facing edges 15. Since the vanes 11 and 12 are located nearer the axis of rotation of the shaft 24 than the cutting edges 31, said cutting edges travel faster than the vanes and are moving in advance of the air which is being propelled from the vane edges 15, so that the vanes will not tend to blow the grass, before it is cut, away from the cutting edges. Rather, after the grass has been cut and the clippings thrown upwardly from the cutting edges 31, the clippings will be entrained in the currents of air moving outward over the ends of the blade 27. This air with the entrained clippings is caused to move around the interior of the apron 21 in the same direction as the fan attachment 10, as indicated by the arrow 30. Accordingly, currents of air propelled by the vanes 11 and 12 with the grass clippings entrained therein will be propelled toward and escape through the outlet 32 and will be prevented from traveling upwardly against the top wall 20. The reinforcing ribs 18 are provided to prevent the vanes 11 and 12 from being bent inwardly by the pressure of the air impinging against the outer sides of said vanes.

The intermediate or base portion 13 may be scored around the opening 17 to provide knockout ring sections or bushing segments 34 and 35, one or both of which can be knocked out to enlarge the fastening receiving opening of the fan attachment 10, to accommodate said attachment to mower drive shafts having fastening means of different diameters, as illustrated in FIGURE 5.

As illustrated in FIGURES 6 and 7, instead of the fan attachment being provided with reinforcing ribs 18 including portions extending into the base portion 13, the vanes 11 and 12 may be provided with reinforcing ribs 18' which terminate at the lower ends of said vanes and do not extend into the intermediate or base portion 13.

Various other modifications and changes are contemplated and may be resorted to, without departing from the function or scope of the invention as hereinafter defined by the appended claims.

I claim as my invention:

1. In combination with a rotary driven substantially upright lawn mower shaft, an elongated mower blade having an opening intermediate of its ends, and fastening means engaging through said opening and detachably securing the blade to a lower end of the shaft; a fan attachment having a pair of vanes straddling the blade and extending upwardly therefrom and an intermediate portion connecting said vanes in substantially parallel relation to one another and disposed beneath the intermediate portion of the blade, said intermediate portion of the fan attachment having an opening receiving the fastening means for securing the fan attachment to the blade and shaft.

2. In a combination as defined by claim 1, said vanes being longitudinally offset relative to one another in directions toward the leading edges of the blade ends.

3. The combination as defined by claim 2, the leading edges of the blade ends providing cutting edges, said cutting edges being spaced outwardly from the remote outer ends of the vanes.

4. The combination as defined by claim 3, the remote ends of said vanes being inclined outwardly and upwardly to provide downwardly facing edges around which the air is propelled from the vanes.

5. A combination as defined by claim 1, said intermediate portion of the fan attachment extending obliquely across said blade, and said vanes being longitudinally offset relative to one another such that remote end portions of the vanes extend upwardly from leading edge portions of the blade.

6. In a combination as defined by claim 1, said vanes having externally embossed reinforcing ribs extending from top to bottom thereof.

7. In a combination as defined by claim 1, said vanes having externally embossed reinforcing ribs extending from top to bottom thereof, and including portions formed in parts of the intermediate portion of the fan attachment.

8. In a combination as defined by claim 1, said intermediate portion of the fan attachment being scored around the opening thereof to provide rings of knockout segments for varying the size of said opening.

9. A fan attachment for a lawn mower comprising a pair of vanes adapted to closely straddle an intermediate portion of a rotary-type lawn mower blade and to extend upwardly therefrom, an intermediate portion connecting said vanes and adapted to be disposed against an underside of the blade, and said intermediate portion having an opening adapted to receive fastening means securing the blade to a mower drive shaft for detachably securing the attachment to the shaft and blade.

References Cited in the file of this patent

UNITED STATES PATENTS

| | | |
|---|---|---|
| 1,785,524 | Milcoff | Dec. 16, 1930 |
| 1,899,564 | Frey | Feb. 28, 1933 |
| 2,475,716 | Nabors | July 12, 1949 |
| 2,636,333 | Michaels | Apr. 28, 1953 |
| 2,663,984 | Clark | Dec. 29, 1953 |
| 2,752,699 | Gustafson | July 3, 1956 |
| 2,814,924 | Group et al. | Dec. 3, 1957 |